US006200108B1

(12) United States Patent
Caudill et al.

(10) Patent No.: US 6,200,108 B1
(45) Date of Patent: Mar. 13, 2001

(54) HEAT EXCHANGING MEANS FOR A PUMP MOTOR USING A BYPASS TUBE WITHIN A RECIRCULATING WATER SYSTEM

(75) Inventors: Dirk A. Caudill, Orange; Reuel S. Orocio, Covina, both of CA (US)

(73) Assignee: Aqua-Flo, Incorporated, Chino, CA (US)

(*) Notice: Subject to any disclaimer, the term of this patent is extended or adjusted under 35 U.S.C. 154(b) by 0 days.

(21) Appl. No.: 09/270,459

(22) Filed: Mar. 15, 1999

Related U.S. Application Data

(63) Continuation-in-part of application No. 09/038,743, filed on Mar. 11, 1998, now Pat. No. 5,930,852.

(51) Int. Cl.[7] .............................. F04B 17/00; A47K 3/00
(52) U.S. Cl. .................. 417/366; 417/370; 417/313; 165/47; 4/541.1; 4/493; 4/509; 285/14
(58) Field of Search ..................... 417/366, 313, 417/367, 369, 370, 423.11; 165/47; 4/541.1, 493, 509; 285/14, 19, 20, 342, 343, 348

(56) References Cited

U.S. PATENT DOCUMENTS

| 2,734,459 | * | 2/1956 | Zimsky ........................... 417/367 |
| 2,887,062 | * | 5/1959 | Camett et al. ................. 417/370 |
| 4,198,191 | | 4/1980 | Pierce . |
| 4,854,373 | | 8/1989 | Williams . |
| 5,038,853 | | 8/1991 | Calloway, Sr. et al. . |
| 5,092,951 | | 3/1992 | Popovich et al. . |
| 5,144,177 | * | 9/1992 | Rupprecht ...................... 417/370 |
| 5,172,754 | | 12/1992 | Graber et al. . |
| 5,178,523 | | 1/1993 | Cheng-Cheng . |
| 5,199,116 | | 4/1993 | Fischer . |
| 5,283,915 | * | 2/1994 | Idland et al. ................... 4/541.1 |
| 5,433,487 | * | 7/1995 | Kuhn et al. ..................... 285/342 |
| 5,509,463 | | 4/1996 | Calloway, Sr. et al. . |
| 5,585,025 | | 12/1996 | Idland . |

* cited by examiner

Primary Examiner—Charles G. Freay
Assistant Examiner—Cheryl J. Tyler
(74) Attorney, Agent, or Firm—Jack C. Munro

(57) ABSTRACT

A pump which is designed to be mounted within a recirculating water system where a portion of the recirculating water is diverted (bypass water) and cause to flow through the motor chamber with this recirculating water to absorb heat that is produced during the operation of the motor. The heated bypass water is then added back to the recirculating water. The pump includes an electric motor which is mounted within a pump motor chamber of a motor housing and is completely enclosed therein. The pump motor chamber is filled with oil thereby submerging of the electric motor in oil. A water conducting tube is mounted within the pump motor chamber and surrounds the electric motor. The tube inlets water from the pressure side of the pump impeller, conducts this bypass water entirely through the tube and then discharges the bypass water into the inlet of the recirculating water to the pump impeller. The heat that is produced in the operation of the motor is absorbed by the oil which in turn is conducted through the tube to be absorbed by the bypass water prior to being added back into the recirculating water.

5 Claims, 5 Drawing Sheets

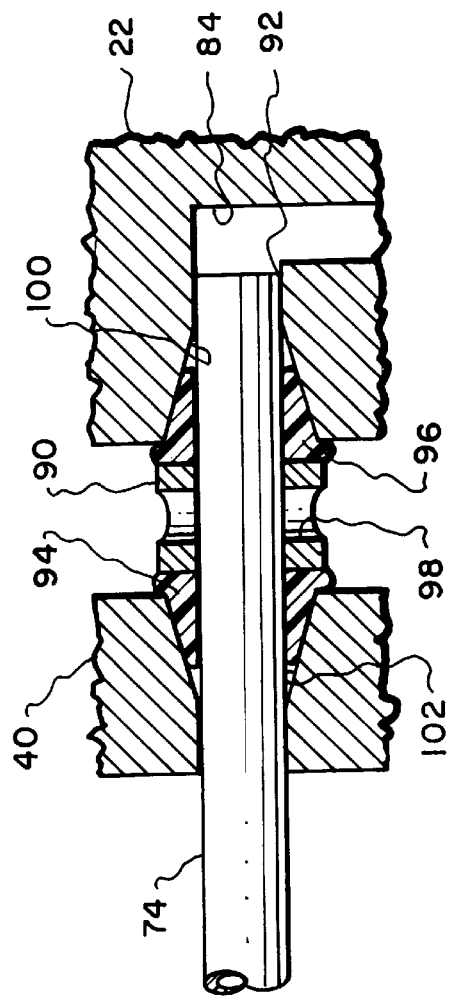
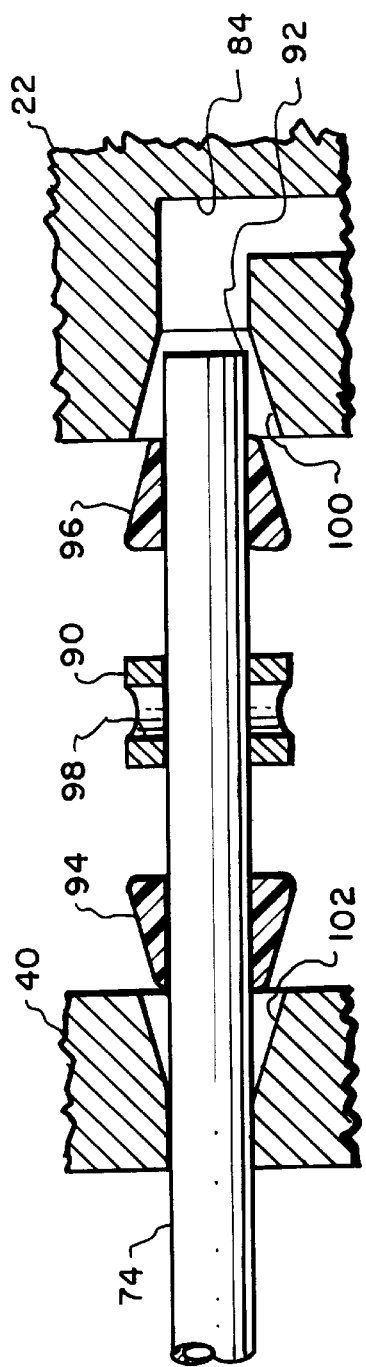

HEAT EXCHANGING MEANS FOR A PUMP MOTOR USING A BYPASS TUBE WITHIN A RECIRCULATING WATER SYSTEM

REFERENCE TO PRIOR APPLICATION

This application is a continuation-in-part of patent application Ser. No. 09/038,743, now U.S. Pat. No. 5,930,852 filed Mar. 11, 1998, entitled HEAT EXCHANGING PUMP MOTOR FOR USAGE WITHIN A RECIRCULATING WATER SYSTEM which includes one inventor of the present application.

BACKGROUND OF THE INVENTION

1) Field of the Invention

The field of this invention relates generally to heat exchangers and more particularly to a heat exchanger in conjunction with a pump which is mounted within a recirculating water system where the heat of the motor is utilized to raise the temperature of the recirculating water.

2) Description of the Prior Art

The structure of the present invention is designed primarily to be used in conjunction with a bathtub which includes a plurality of water jet nozzles used to create a turbulent action of the water within the bathtub for reasons of therapy and/or relaxation to a human. However, it is possible that this invention could be used with a spa, hot tub or therapy tub all of which utilize jet nozzles to force jets of water within the tub with the tub being occupied generally by a single human. It is normal for a plurality of humans to be located within a spa, hot tub or therapy tub. However, within a bathtub there is generally only a single individual. It is possible that the pump of the present invention could be used for liquids other than water.

The bathtubs which have water jet nozzles have a recirculating water system which utilizes a pump which has a motor causing rotation of a centrifugal impeller which functions to cause the water to move through the recirculating water system. It is desirable to heat the water within these bathtubs with generally this water being heated between 100 and 104 degrees Fahrenheit. A heater is sometimes included in conjunction with the bathtub with the heater functioning to raise the temperature of the recirculating water to the desired temperature level. During the time that the bathtub is being used, the heat from the water is quickly lost to the ambient atmosphere. Therefore, this heat needs to be replaced. In the past, it has been common to add additional hot water from the tap or activate a heater, if available, that is mounted in conjunction with the bathtub to reheat the water. However, it has been discovered that the electric motor of the pump of the recirculating water quickly becomes quite hot. It is desirable to have the motor temperature as low as possible to maintain an efficient operation of the motor. Therefore, it is beneficial to remove as much heat from the motor as possible.

It has been known to take some of the water that is being recirculated through the system and pass that bypass water through the motor with the idea that the bypass water is used to extract the heat produced by the motor with this heat being added back to the recirculating water. The advantage of such a heat exchange arrangement is that it increases the efficiency and longevity of operation of the motor of the pump and the heat that is normally wasted is now utilized therefore either eliminating or decreasing the requirement for an additional heater for heat to be added to the recirculating water.

In the past, it has been known to wrap a tubular coil about a pump motor and then conduct bypass water through that tubular coil to extract the heat that is produced from the motor. This prior art water bypass arrangement has been known to extract the water from the outlet side of the pump, move the water through the bypass tube and then reinject it back into the inlet side of the pump. The disadvantage of this type of an arrangement is that there is very little heat transfer between the motor and the tubular coil. The surface of contact between the tubular coil and the motor surface is almost nil. The heat transfer relies on convection rather than conduction which is the most efficient way of exchanging heat.

SUMMARY OF THE INVENTION

One of the primary advantages of the present invention is to construct a cost efficient and energy efficient heat exchange system for a recirculating water system for a bathtub.

Another objective of the present invention is to provide for cooler operation of a motor used within a bathtub with water jet nozzles which thereby increases longevity, efficiency and diminishes maintenance during the operating life of the motor.

Another objective of the present invention is to construct a water bypass system that is mounted about a motor that is completely closed so that no water ever comes into contact with any portion of the motor providing for safe operation of the pump of the present invention.

Another objective of the present invention is to maximize the heat exchange efficiency by utilizing the entire surface area of the heat exchanging system through a heat exchanging medium.

The pump of the present invention utilizes a conventional electric motor which is formed of a stator and a rotor. The rotor is to be rotationally driven by the application of electrical energy to the stator. The rotor is connected to an output shaft which in turn is mounted in conjunction with an impeller. The impeller is located in an impeller chamber of a pump housing with the impeller chamber being connected to a main water inlet and a main water outlet of the recirculating water. The impeller is to function to supply water to the bathtub which is forcibly ejected through a plurality of jet nozzles mounted in conjunction with the wall of the bathtub. The electric motor is submerged within an oil which is contained within a completely closed motor chamber formed within a motor housing. A water conducting tube surrounds the electric motor with the inlet to this water conducting tube connecting with the impeller chamber which receives water under pressure into this tube. Only a small portion of the water that is conducted through the impeller chamber is bypassed through this tube. The tube is formed into a plurality of U-shaped sections which are continuous with the U-shaped sections being submerged within the oil located about the electric motor of the pump. The U-shaped sections may be rolled in coils to form a coiled section. The outlet to the tube connects to the volute insert which forms an isolated chamber with the volute's wall connected to the pump's main water inlet. As a result, a substantial pressure differential is created which moves the water rapidly through the bypass tube from the impeller chamber into the main water inlet.

BRIEF DESCRIPTION OF THE DRAWINGS

FIG. 6 is a cross-sectional view through the watertight connection of the water conducting tube between the seal plate and the motor cover showing the watertight connection in the installed position; and FIG. 7 is an exploded, cross-sectional view, similar to FIG. 6, showing the watertight connection before installation.

DETAILED DESCRIPTION OF THE PREFERRED EMBODIMENT

Figure 1:
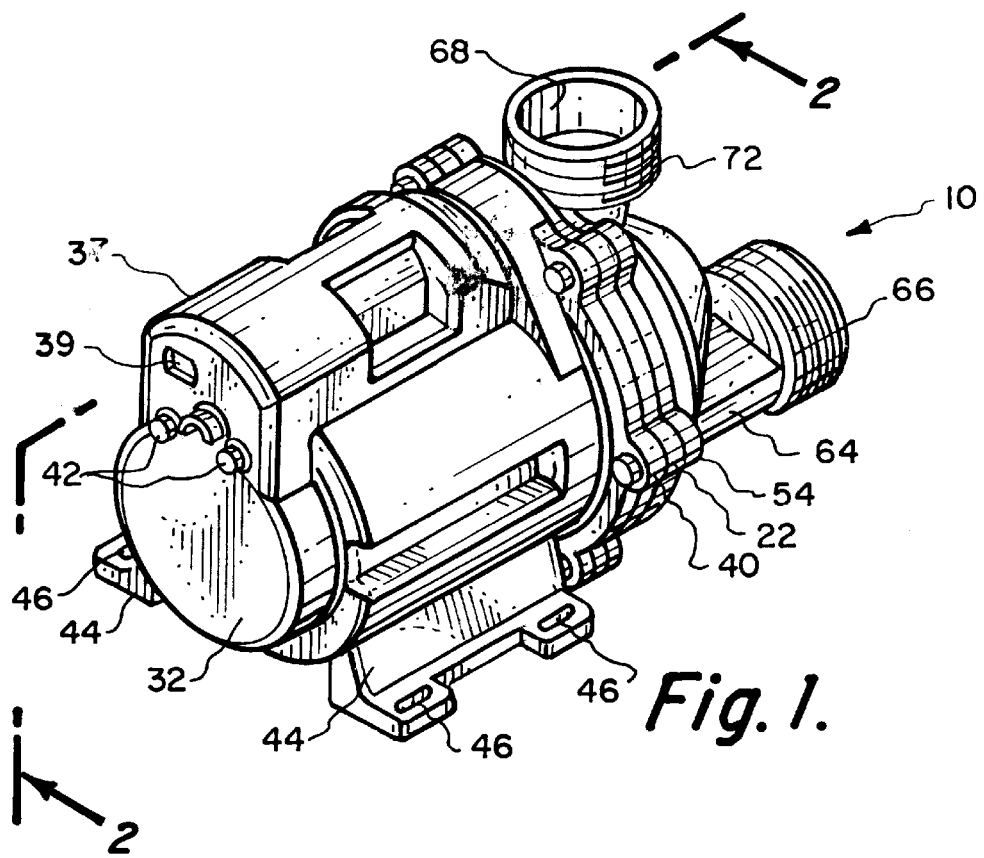
FIG. 1 is an exterior isometric view of the pump constructed in accordance with this invention.

Referring particularly to the drawings, there is shown the pump 10 of this invention. Pump 10 is to be operated electrically and includes an electric motor 12. The electric motor 12 is composed of a rotor 14 and a stator 16 with the stator being mounted about the rotor 14. An output shaft 18 is caused to rotate by the rotor 14. The output shaft 18 is rotationally mounted by a bearing 20 within a motor cover 40. The motor cover 40 forms a wall to enclose the pump motor chamber 24. The seal plate 22 and impeller housing 54 forms the enclosure of impeller chamber 26. The electric motor 12 is mounted within the pump motor chamber 24. The output shaft 18 has an enlarged annular protuberance 23 which forms a watertight connection with water seal 25. Water seal 25 is mounted within hole 27 formed in seal plate 22. Seal plate 22 is mounted on impeller housing 54.

The aft end of the electric motor 12 is mounted within a motor back bracket 28. The motor back bracket 28 is connected to a series of bolts 34. These bolts 34 are attached to the motor cover 40. The function of the motor back bracket 28 in connection with the bolts 34 and motor cover 40 secures the rotor 14 and the stator 16 in their respectfully concentric position. The motor back bracket 28 is mounted in a close conforming manner within a cavity 30 formed within the motor housing 32 which supports the weight of the electric motor 12. The space that surrounds the electric motor 12 within the pump motor chamber 24 is to be filled with an oil, which is not shown. A desirable type of oil would be a naphthenic mineral oil. However, it is to be understood that it is to be within the scope of this invention that the oil is to include any liquid that is non-electrically conductive and functions to transfer heat. Both the rotor 14 and the stator 16 are submerged within the oil.

Associated with the motor housing 32 is a capacitor chamber 36. Located within the capacitor chamber 36 is a capacitor 38. The capacitor chamber 36 is normally closed by a capacitor cap 37. Cap 37 includes a vent opening 39 to permit airflow into chamber 36 to prevent overheating of capacitor 38. The capacitor 38 is used in conjunction with the electrical operation of the motor 12 and forms no specific part of this invention.

The motor housing 32 is attached to a motor cover 40 which is deemed part of the motor housing 32. The motor housing 32 and motor cover 40 are fixed to the seal plate 22 by means of bolts 42. The motor housing 32 is supported by a base plate 44. The base plate 44 actually is an integral part of the motor housing 32 and include a plurality of holes 46. The holes 46 are to be used to engage with fasteners, which are not shown, to securely mount the motor housing 32 onto an exterior fixed structure.

The output shaft 18 from bearing 20 is connected to a seal assembly 48 which includes water seal 25. The output shaft 18 from the seal assembly 48 is connected to an impeller 50. The impeller 50 is to be rotated within the impeller chamber 26. A wear ring 56 is mounted on the inlet side of impeller 50 to form a watertight barrier between the cavity 58 and inlet passage 62. The wear ring 56 has a hollow center 60 which is installed around the front opening 61 of impeller 50. The bearing 20 also has a hollow center, which is not shown. The hollow center 60 is connected to inlet passage 62 of an inlet conduit 64. The inlet conduit 64 terminates in an externally threaded section 66. The externally threaded section 66 is to be threadably secured to a water supply conduit, which is not shown.

The water is to be supplied from the water supply conduit through the inlet passage 62, through the hollow center 60, through front opening 61, into the impeller 50. The rotation of the impeller causes the water to be moved centrifugally outward and propelled into the impeller chamber 26 and then into outlet passage 68 of outlet conduit 70. The outlet conduit 70 has an externally threaded section 72 which is to be connected to an outlet pipe, which is not shown.

Figure 5:
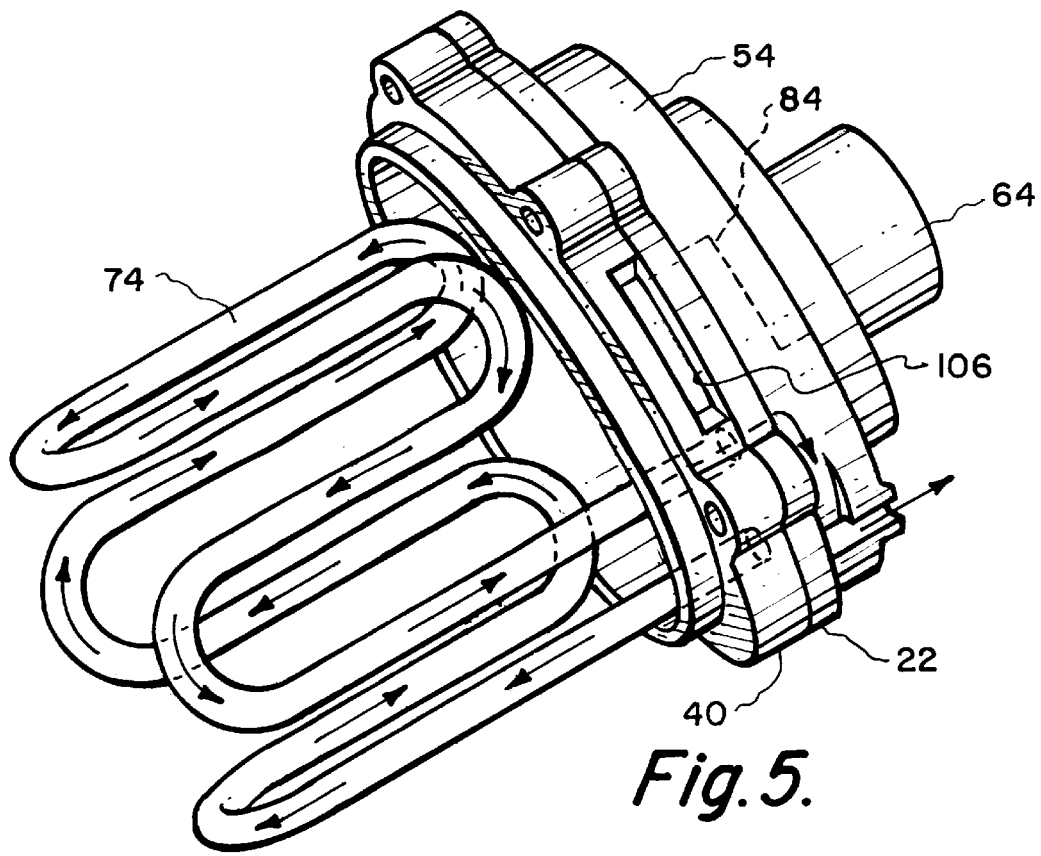
FIG. 5 is an isometric view of the bypass tube mounted in conjunction with the mounting plate which is mounted in conjunction with the seal plate included within this invention.
Figure 2:
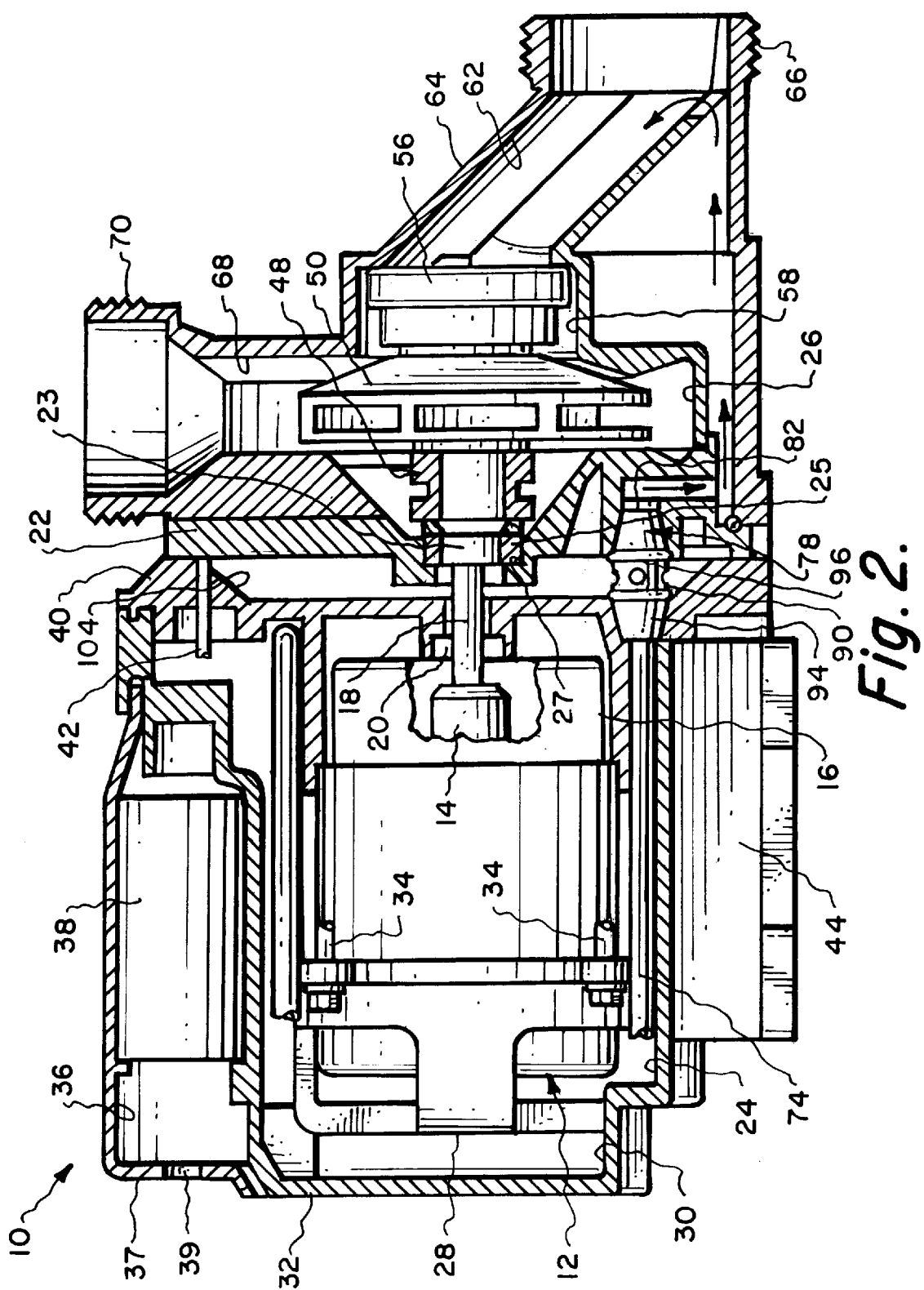
FIG. 2 is a longitudinally, cross-sectional view through the pump of this invention taken along line 2—2 of FIG. 1.
Figure 3:
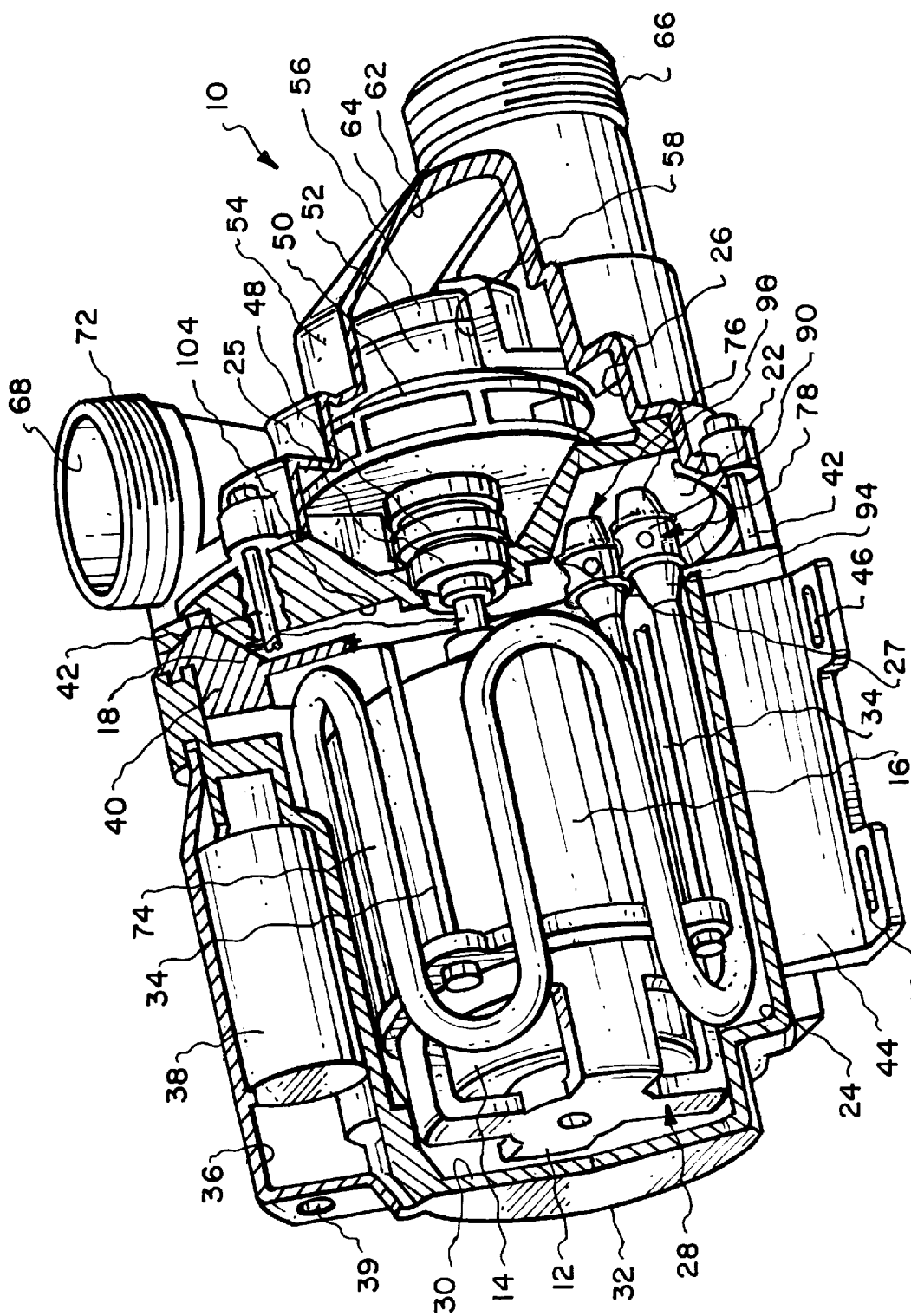
FIG. 3 is a partial cut-away, isometric view of the pump of this invention.
Figure 4:
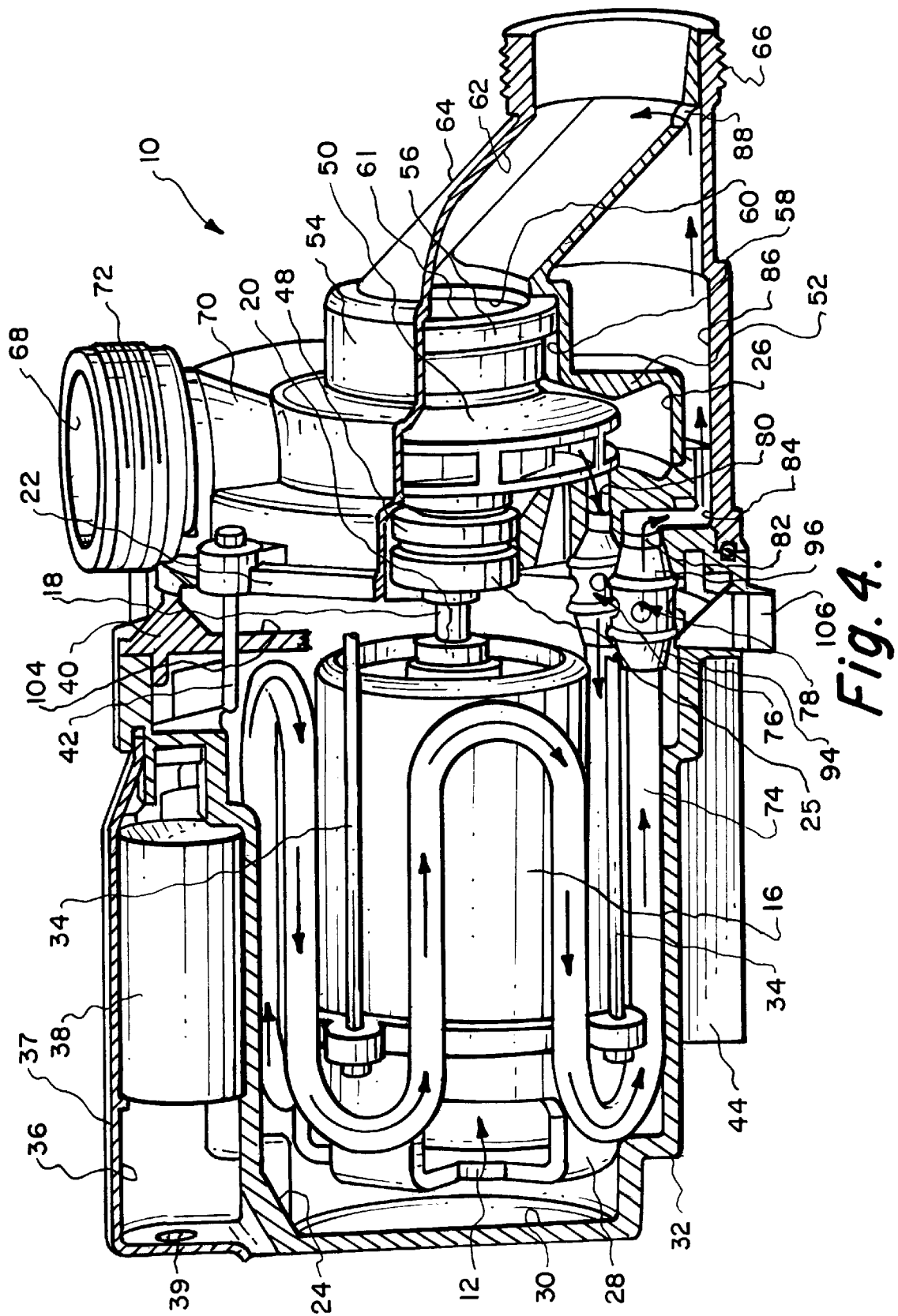
FIG. 4 is a partial cut-away, isometric view of the pump of this invention showing clearly the flow path of the water through the bypass tube utilized in conjunction with the pump of this invention.

Mounted within the pump motor chamber 24 is a water conducting tube 74. The tube 74 is formed into a series of U-shaped sections, as clearly shown in FIG. 5. Tube 74 is continuous and is arranged to surround the electric motor 12 and a portion of the motor back bracket 28. The tube 74 is not actually in physical contact with the motor housing 32 but is slightly spaced therefrom. It is to be understood that the tube 74 is to be also submerged in the oil located within the pump motor chamber 24. The ends of tube 74 are secured by inlet liquid tight connection 76 and an outlet liquid tight connection 78. It is to be noted that the tube 74 is intended to be leak free. Both the inlet liquid tight connection 76 and the outlet outlet liquid tight connection 78 are located at the lowest end of the pump 10. The reason for this is that when the pump 10 is not operating, any water contained within the tube 74 will tend to drain back into the suction side of the pump 10 which comprises the inlet passage 62. Also, any water contained within the impeller chamber 26, when the pump 10 is not operating, will similarly drain back into the chamber 86 which is connected to inlet passage 62 through hole 88. The tube 74 is composed of a plurality of U-shaped sections arranged in a continuous tubular arrangement. Each U-shaped section has a pair of legs. The longitudinal center axis of each leg is parallel to the rotational axis of the electric motor 12. The purpose of this parallel arrangement is so all the water contained within the tube 74 will drain by gravity from the tube 74 when the electric motor 12 is not operating.

The tube 74 could also be configured as in a spiral shape instead of the U-shaped sections. In the spiral shape, the tube 74 would be wound around the electric motor 12.

The inlet liquid tight connection 76 is located in opening 80 formed within the seal plate 22. This opening 80 connects directly with the impeller chamber 26. Within impeller chamber 26, because of the rotation of the impeller 50, the impeller chamber 26 is pressurized. This pressure will cause a certain amount of water to be bypassed into the tube 74. This bypassed water will be conducted entirely through the tube 74 to the outlet liquid tight connection 78. The outlet liquid tight connection 78 is located in opening 82 formed within the seal plate 22. The opening 82 is connected with a passage 84 formed within the seal plate 22. Passage 84 then connects with a chamber 86 formed by volute insert 52 and volute 54. Chamber 86 connects by hole 88 to the inlet passage 62.

Referring particularly to FIGS. 6 and 7, there is shown the liquid tight connection 78. A metallic spacer 90 is placed over the tube 74 adjacent the outlet end 92 of the tube 74. On each side of the spacer 90, also located about the tube 74, are located deflectible grommets 94 and 96. A preferable material of construction for grommets 94 and 96 would be rubber. The grommet 94 is narrowly tapered in a direction away from spacer 90 and grommet 96 is also narrowly tapered away from spacer 90. The spacer 90 includes a series of holes 98. The grommet 96 is to be located within tapered hole 100 formed within the seal plate 22. The outlet end of the tube 92 is to be located within passage 84. The tapered grommet 94 is mounted within tapered opening 102 formed within the motor cover 40.

During installation of the pump 10 of this invention when the bolts 42 are tightened, the motor cover 40 will be moved toward seal plate 22. During this movement, the grommets 94 and 96 will be compressed tightly within their respective tapered openings 102 and 100 forming a liquid tight seal respectively with the motor cover 40 and the seal plate 22. The seal with motor cover 40 is to prevent leakage of oil from chamber 30. The seal with seal plate 22 is to prevent leakage of water from passage 84. The spacer 90 causes the deformation of the grommets 94 and 96 tightly pressing the grommets 94 and 96 with the wall surfaces of the openings 100 and 102 achieving this liquid tight connection as is clearly shown in FIG. 6. The purpose of the openings 98 within the spacer 90 is to permit passage therethrough of any liquid if a leakage does occur between the grommets 94 and 96 and the tube 74. The leaked liquid is conducted through the holes 98 into the chamber 104 located between the cover 40 and the seal plate 22. Connecting with the chamber 104 is a drain hole 106 which permits this leaked liquid to pass exteriorly of the pump 10. It is to be understood that the inlet liquid tight connection 76 is constructed in precisely the same way as the outlet liquid tight connection 78.

During the operation of the pump 10 of this invention, water is being pulled through the suction side, which is called the inlet passage 62, and moved by the impeller through the outlet passage 68. A small amount of the water from the impeller chamber 26 is discharged through the opening 80 into the tube 74, and as the water is conducted through the tube 74 is to absorb heat from the operation of the electric motor 12. The heat of the electric motor 12 raises the temperature of the oil contained within the pump chamber 24. The heat within this oil is conducted through the entire wall of the tube 74 and then causes the water contained therein to be substantially raised in temperature. In actual practice, the heated water will exit from tube 74 through opening 82 into chamber 86 and then through hole 88 into the inlet passage 62. The water contained within the inlet passage 62 will be at a decreased pressure from the water contained within the impeller chamber 26 and actually will be at a slight vacuum compared to atmospheric pressure. This pressure differential between the opening 80 and the opening 82 causes a steady flow of water through the tube 74. The heated water that is mixed with cold water within inlet passage 62 is pulled into the impeller 50 and then is discharged by the impeller 50 through the outlet passage 68. The amount of heat the water from the tube 74 absorbs will, in most instances, be sufficient to raise the entire recirculating water within a bathtub to within the range of one hundred to one hundred four degrees Fahrenheit.

What is claimed is:

1. A pump for use in a recirculating water system comprising:

an electric motor having an output shaft, said output shaft having a rotational axis, an impeller connected to said output shaft, said impeller located in an impeller chamber, rotation of said impeller results in liquid flowing through said impeller chamber from an inlet to an outlet, rotation of said impeller moves the liquid toward said outlet creating a pressurized environment within said impeller chamber;

a pump motor housing having a pump motor chamber with said electric motor being located within said pump motor chamber, said impeller located exteriorly of said pump motor chamber, a tube located within said pump motor chamber, said tube being capable of conducting liquid from said pressurized environment through an outlet connection to said inlet, whereby said liquid within said tube is to absorb heat from said electric motor resulting in heating of said liquid and then result in discharging of the liquid in said tube into said inlet; and said tube forming a plurality of U-shaped sections, each said U-shaped section having a pair of legs, each said leg located parallel to said rotational axis whereby the configuration of said tube will allow complete draining of liquid from within said tube by gravity.

2. The pump as defined in claim 1 including:

oil substantially filling said pump motor chamber submerging said electric motor and said tube, whereby heat from the operation of said electric motor is absorbed by said oil causing said oil to rise in temperature with this heat in said oil being absorbed by said liquid within said tube causing the temperature of said liquid to rise.

3. A pump for use in a recirculating water system comprising:

an electric motor having an output shaft, said electric motor located in a motor chamber, said output shaft having a rotational axis, an impeller connected to said output shaft, said impeller located in an impeller chamber, rotation of said impeller is to result in liquid flowing through said impeller chamber from a main liquid inlet to a main liquid outlet, said impeller chamber being separated from said motor chamber;

a liquid conducting tube located within said motor chamber, said liquid conducting tube surrounding said electric motor, said liquid conducting tube having a bypass inlet connecting with said impeller chamber, said liquid conducting tube having a bypass outlet connecting with said main liquid inlet; and said tube being formed of a plurality of U-shaped sections, each said U-shaped section having a pair of legs, each said leg located parallel to said rotational axis, whereby the configuration of said tube is to maximize the extraction of heat that is produced from said electric motor by absorbing of the heat contained within the liquid within said tube.

4. A pump for use in a recirculating water system comprising:

an electric motor having an output shaft, said output shaft having a rotational axis, an impeller connected to said output shaft, said impeller located in an impeller chamber, rotation of said impeller results in liquid flowing through said impeller chamber from an inlet to an outlet, rotation of said impeller moves the liquid toward said outlet creating a pressurized environment within said impeller chamber;

a pump motor housing having a pump motor chamber with said electric motor being located within said pump motor chamber, said impeller located exteriorly of said pump motor chamber, a tube located within said pump motor chamber, said tube being capable of conducting liquid from said pressurized environment through an outlet connection to said inlet, whereby said liquid within said tube is to absorb heat from said electric motor resulting in heating of said liquid and then result in discharging of the liquid in said tube into said inlet; and said outlet connection utilizes a pair of deflectable grommets and a rigid spacer, said grommets and said spacer being mounted on said tube with said spacer located between said grommets, said spacer and said grommets being movable on said tube, said grommets being compressingly deformed by being moved on said tube toward each other pressing each said grommet into tight engagement with said spacer establishing a liquid tight connection between said pump motor housing and said tube.

5. The pump as defined in claim 4 wherein:

said spacer including at least one hole, said hole to provide for leakage of liquid externally of said pump motor housing.

\* \* \* \* \*